United States Patent
Kolls et al.

(10) Patent No.: US 11,922,512 B1
(45) Date of Patent: Mar. 5, 2024

(54) TRIP-SEGMENT PAYMENTS FOR VEHICLE INSURANCE

(71) Applicant: Wells Fargo Bank, N.A., San Francisco, CA (US)

(72) Inventors: H. Brock Kolls, Alpharetta, GA (US); Andrew J. Garner, IV, State Road, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/659,609

(22) Filed: Apr. 18, 2022

Related U.S. Application Data

(62) Division of application No. 15/796,334, filed on Oct. 27, 2017, now Pat. No. 11,334,951.

(51) Int. Cl.
| | |
|---|---|
| *G06Q 30/0283* | (2023.01) |
| *G01C 21/34* | (2006.01) |
| *G01C 21/36* | (2006.01) |
| *G05D 1/00* | (2006.01) |
| *G06Q 40/08* | (2012.01) |
| *G06Q 20/26* | (2012.01) |
| *G06Q 20/34* | (2012.01) |

(52) U.S. Cl.
CPC ......... *G06Q 40/08* (2013.01); *G01C 21/3453* (2013.01); *G01C 21/3697* (2013.01); *G05D 1/0088* (2013.01); *G06Q 20/26* (2013.01); *G06Q 20/34* (2013.01); *G06Q 30/0283* (2013.01)

(58) Field of Classification Search
None
See application file for complete search history.

(56) References Cited

U.S. PATENT DOCUMENTS

| | | | |
|---|---|---|---|
| 7,542,915 B2 | 6/2009 | Kendrick | |
| 8,510,133 B2 | 8/2013 | Peak et al. | |
| 8,577,703 B2 | 11/2013 | McClellan et al. | |
| 8,667,292 B2 | 3/2014 | Danezis et al. | |
| 8,799,036 B1 * | 8/2014 | Christensen | G06Q 30/0208 340/439 |
| 8,892,451 B2 | 11/2014 | Everett et al. | |

(Continued)

FOREIGN PATENT DOCUMENTS

WO   WO-2010062899 A1 *   6/2010   ......... G06Q 30/0201

OTHER PUBLICATIONS

Smit et al., "(Micro)insurtech: 5 challenges tech is addressing in microinsurance," CENFRI, http://cenfri.org/blog/5-challenges-tech-is-addressing-in-microinsurance, 2016, 3 pages.

(Continued)

*Primary Examiner* — Bruce I Ebersman
*Assistant Examiner* — Matthew Cobb
(74) *Attorney, Agent, or Firm* — Merchant & Gould P.C.

(57) ABSTRACT

A method for determining vehicle insurance costs includes receiving a starting location and a destination location for a trip using a vehicle. One or more routes for the vehicle from the starting location to the destination location are received. A cost of insurance is determined for each of the one or more routes for the trip. The cost of insurance for each of the one or more routes for the trip is displayed. A selected route from the one or more routes is received. Operation of the vehicle for the trip is enabled along the selected route.

16 Claims, 11 Drawing Sheets

(56) References Cited

U.S. PATENT DOCUMENTS

| | | | |
|---|---|---|---|
| 8,924,241 B2 | 12/2014 | Grosso | |
| 10,246,097 B1* | 4/2019 | Fields | G06Q 40/08 |
| 10,304,141 B1* | 5/2019 | Healy | G06Q 40/08 |
| 10,416,670 B1* | 9/2019 | Fields | B60W 30/0956 |
| 10,430,883 B1* | 10/2019 | Bischoff | G06Q 20/102 |
| 10,853,881 B1* | 12/2020 | LaBarre | G06Q 40/08 |
| 11,014,567 B1* | 5/2021 | Fields | B60W 40/09 |
| 11,230,243 B2* | 1/2022 | Kumar | G06Q 50/30 |
| 2007/0282638 A1* | 12/2007 | Surovy | G06Q 40/08 705/4 |
| 2010/0030586 A1* | 2/2010 | Taylor | G06Q 30/02 705/4 |
| 2013/0046562 A1 | 2/2013 | Taylor et al. | |
| 2014/0039936 A1 | 2/2014 | Lobo et al. | |
| 2014/0052479 A1 | 2/2014 | Kawamura | |
| 2014/0222469 A1 | 8/2014 | Stahl et al. | |
| 2016/0071082 A1* | 3/2016 | Driscoll | G07F 17/0057 705/13 |
| 2016/0086285 A1* | 3/2016 | Jordan Peters | G08G 1/096827 701/484 |
| 2016/0171521 A1* | 6/2016 | Ramirez | B60K 35/00 701/409 |
| 2016/0171617 A1 | 6/2016 | Eshwar et al. | |
| 2017/0061812 A1 | 3/2017 | Lahav et al. | |
| 2020/0317216 A1* | 10/2020 | Konrardy | B60W 30/182 |
| 2021/0304313 A1* | 9/2021 | Chan | G06Q 30/0631 |

OTHER PUBLICATIONS

Sofia, "InsuranceTech Innovation Booms: Challenges and Opportunities," https://letstalkpayments.com/insurancetech-innovation-booms-challanges-and-opportunities/, accessed Apr. 16, 2017, 3 pages.

Van Wirdum, "Teambrella Wants to Revolutionize Insurance Coverage With Peer-To-Peer Bitcoin Payments," https://bitcoinmagazine.com/articles/teambrella-wants-to-revolutionize-insurance-coverage-with-peer-to-peer-bitcoin-payments-1459521851/, accessed Apr. 16, 2017, 5 pages.

* cited by examiner

TRIP-SEGMENT PAYMENTS FOR VEHICLE INSURANCE

BACKGROUND

In the United States, vehicle insurance is required for people who drive motor vehicles. Individuals who own a motor vehicle are required by state law to the purchase vehicle insurance in order to legally operate the motor vehicle. Individuals who rent or lease motor vehicles are also required to have vehicle insurance before being able to operate the leased or rented motor vehicles. The vehicle insurance for the leased or rented motor vehicles can be purchased from the leasing or rental company or be included in a leasing or rental agreement.

For persons who own motor vehicles, vehicle insurance is typically purchased initially and renewed annually. The cost of the vehicle insurance is typically based on a make and model of the motor vehicle, among other factors. In general, the more expensive the motor vehicle, the higher the cost of the vehicle insurance. Except for individuals who put extensive mileage on their vehicles, the cost of the vehicle insurance is generally the same regardless of how many miles the motor vehicle is driven in a given year.

SUMMARY

Embodiments of the disclosure are directed to a method implemented on an electronic computing device for determining vehicle insurance costs, the method comprising: receiving a starting location and a destination location for a trip using a vehicle; receiving one or more routes for the vehicle from the starting location to the destination location; determining a cost of insurance for each of the one or more routes for the trip; displaying the cost of insurance for each of the one or more routes for the trip; receiving a selected route from the one or more routes; and enabling operation of the vehicle for the trip along the selected route.

In another aspect, a method implemented on an electronic computing device for determining vehicle insurance costs comprises: receiving a starting location and a destination location for a trip using an autonomous vehicle; determining or receiving one or more routes for the autonomous vehicle from the starting location to the destination location; receiving a selection of one of the one or more routes; receiving an authorization for trip-route insurance for the one of the one or more routes; after each segment of the trip is completed, calculating a cost of trip-segment insurance for the respective segment of the trip; at a completion of the trip, calculating a total cost of trip-segment insurance for the trip; and at the completion of the trip, debiting or crediting a payment card of an individual for the total cost of trip-segment insurance for the trip.

In yet another aspect, an electronic computing device comprises: a processing unit; and system memory, the system memory including instructions which, when executed by the processing unit, cause the electronic computing device to: receive a starting location and a destination location for a trip using an autonomous vehicle; determine or receive one or more routes for the autonomous vehicle from the starting location to the destination location; determine a cost of trip-route insurance for each of the one or more routes for the trip; provide to the autonomous vehicle the cost of trip-route insurance for each of the one or more routes for the trip; provide to the autonomous vehicle an offer or incentive for a reduced cost of insurance for a selection of a specific route; receive a selection of the one or more routes; determine whether the specific route was selected; when a determination is made that the specific route was selected, reduce the cost of insurance for the specific route; enable operation of the autonomous vehicle for the trip along the one or more routes; identify a plurality of segments for the one of the one or more routes that is selected; monitor an actual route taken by the autonomous vehicle; when each segment of the actual route is completed, determine a cost of trip-segment insurance for each respective segment of the actual route; when each segment of the actual route is completed, aggregate the cost of trip-segment insurance by maintaining a total cost of trip-segment insurance and adding to the total cost the cost of trip-segment insurance for the completed segment of the actual route; and at a completion of the trip, debit a payment card for the total cost of trip-segment insurance for the trip.

The details of one or more techniques are set forth in the accompanying drawings and the description below. Other features, objects, and advantages of these techniques will be apparent from the description, drawings, and claims.

DETAILED DESCRIPTION

Figure 1:
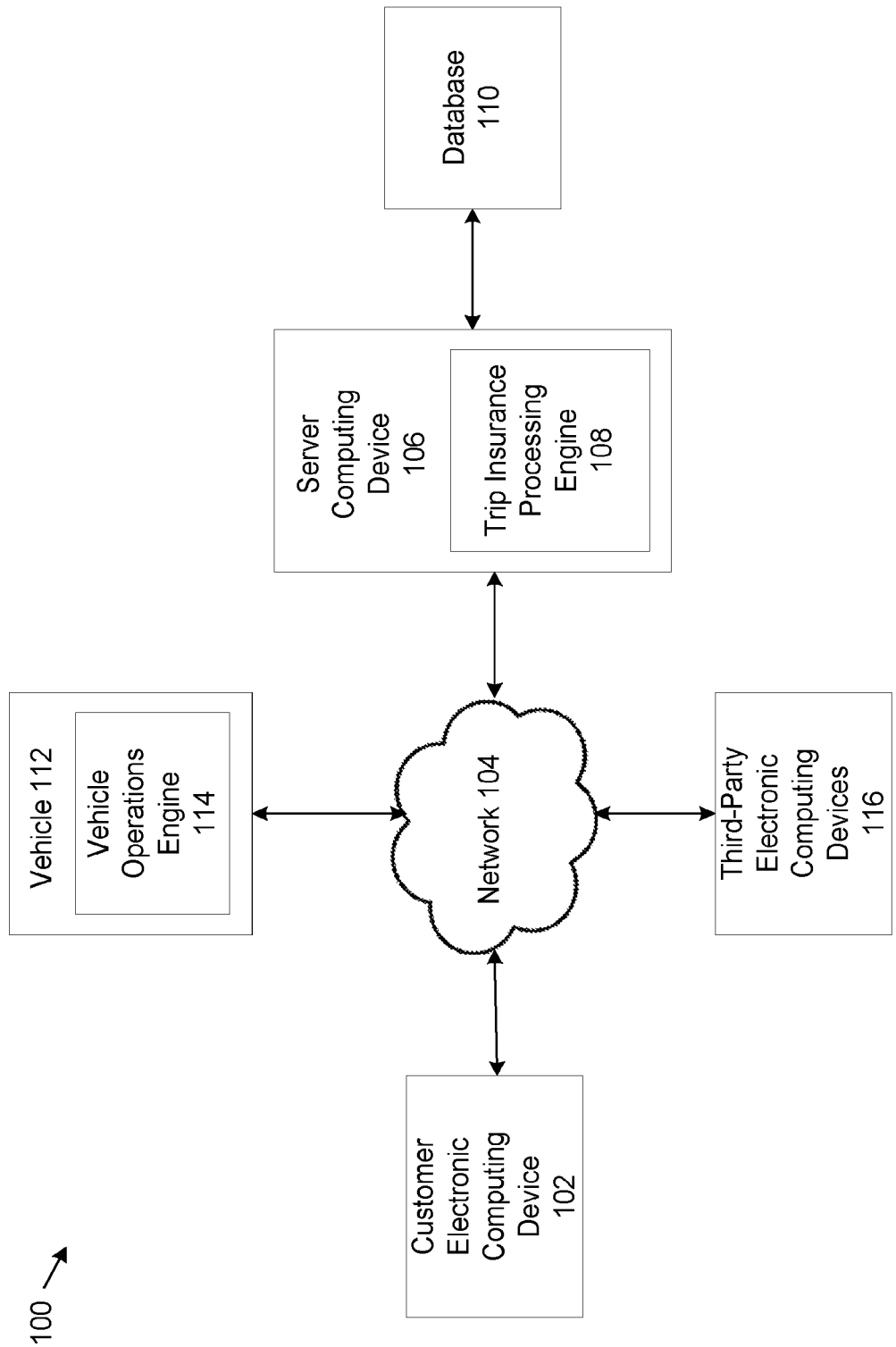
FIG. 1 shows an example system that supports trip-segment payments for vehicle insurance.

The present disclosure is directed to systems and methods for using trip-route insurance to provide vehicle insurance for individuals driving motor vehicles, such as cars, buses, trucks, motorcycles, off-road vehicles, etc. The vehicle insurance can include one or more of liability, collision and comprehensive insurance. The trip-route insurance can allow the individual to purchase vehicle insurance for a single trip in a motor vehicle. Using trip-route insurance on a per trip basis can lower an overall vehicle insurance cost for owning a motor vehicle for certain individuals, such as those who do not drive a motor vehicle very often and/or switch among a variety of motor vehicles.

Using the systems and methods, an individual can provide a starting location and a destination location for a trip. Based on the starting location and destination location, one or more routes for the trip can be identified and a cost of trip-route insurance can be determined for each of the one or more routes. In addition to the route taken, the cost of the trip-route insurance can be based on factors such as current weather conditions, trip distance, current road conditions (e.g. wet, icy, dirt road, potholed, etc.), vehicle type, driver experience/history, whether the vehicle is an autonomous vehicle, current traffic conditions, geography (city, rural, other), a payload (number of humans, animals, and/or cargo), historical factors and other factors. As used in this disclosure, trip-route insurance comprises vehicle insurance for a single trip using the motor vehicle.

The cost of the trip-route insurance for each of the one or more routes can be presented to the individual and a route can be selected. The individual can compare trip-route insurance cost with travel time estimates and route mileage to determine which route would be best to take.

When a route is selected, a payment means of the individual can be pre-authorized for the cost of the trip-route insurance for the selected route. Example payment means can include payment cards, digital wallets, tap and pay and other payment means. In some implementations, when the payment means of the individual is approved for pre-authorization, the motor vehicle to be used on the trip can be made operational. In these implementations, the motor vehicle is not made operational until the individual is approved for trip-route insurance for the trip and the payment means of the individual is pre-authorized. In this disclosure, the payment means is described as a payment card, although other payment means can be used.

In some implementations, the motor vehicle used for the trip is an autonomous (self-driving) vehicle. In other implementations, the motor vehicle used for the trip is a vehicle (either owned, rented or leased by the individual) that can be driven by the individual or by someone designated by the individual to drive. Hybrid situations in which the motor vehicle can be both autonomous and driven manually are also applicable. In addition, the motor vehicle can be a shared vehicle that can be owned or used by multiple different parties.

Once the individual starts the trip, the route of the trip is monitored and an actual route taken by the individual is identified. The cost of trip-route insurance can be modified when the actual route taken by the vehicle is different from the selected route. In addition, using the systems and methods, the selected route can be divided into segments and a trip-segment insurance cost can be calculated for each segment of the selected route. For example, each segment can comprise a measure such as a mile and the trip-segment insurance can be calculated as a cost per mile. In another example, each segment can comprise an identified part of the route, such as a drive through city streets, followed by a drive on a city highway, followed by a drive on a suburban highway, followed by a drive on one or more segments of a highway between cities. Other examples of segments of a route are possible. As used in this disclosure, trip-segment insurance comprises vehicle insurance for a segment of a selected route of a single trip using a motor vehicle.

For each segment of the selected route, the trip-segment insurance can be based on monitoring operational aspects of the trip and motor vehicle, including conditions for that particular segment. For example, a first segment of the trip through city streets can have a lower cost of trip-segment insurance than a second segment of the trip through a city highway, because of greater congestion and higher speeds on the city highway.

When each segment of the trip is completed, the cost of trip-segment insurance for the segment of the trip can be aggregated with a current total cost of trip-segment insurance for the trip. When the trip is completed and the total cost of trip-segment insurance for the trip is greater than the pre-authorized amount of trip-route insurance for the trip, the payment card of the individual can be debited for the amount in which the total cost of the trip-segment insurance for the trip exceeds the pre-authorized amount of the trip-route insurance. When the total cost of the trip-segment insurance for the trip is less than the pre-authorized amount of trip-route insurance for the trip, the payment card of the individual can be credited for the amount for which the trip-segment insurance for the trip is less than the pre-authorized amount of trip-route insurance for the trip. When the payment card for the individual is authorized for the amount of trip-route insurance from the trip but the payment card is not charged for the amount at the beginning of the trip, the payment card is debited for the total cost of trip-segment insurance at the completion of the trip.

In some implementations, the cost of the trip-segment insurance can be applied immediately after a segment of the trip is completed. In these implementations, the actual cost of trip-segment insurance for the segment of the trip can be charged to the payment card of the individual when the segment of the trip is completed. In addition, each trip-segment insurance payment as well as a payment history can be displayed on a display screen in vehicle 112.

Aggregated costs of trip-segment insurance over the course of multiple trips and multiple vehicles can also be used to provide rewards and discounts for individuals. For example, the organization from which an individual contacts to initiate a trip can provide discounts for future trips when the individual completes a specified number of trips. In lieu of or in addition to discounts for future trips, the individual can receive rewards points that can be used to reduce a price of future trips or can be used for gifts or other types of rewards.

The individual can be also incentivized to select a route segment that can benefit a third party. For example, the route segment can include advertising that the individual can view when on the route segment. The incentive can be a reduced cost for the route segment when the individual selects the route that includes the route segment.

The systems and methods disclosed herein are directed to a computer technology that can automatically determine a cost of vehicle insurance for a single trip using a motor vehicle. A plurality of trip routes between a starting and ending location can be presented to an individual. In addition, an estimated cost of insurance for each trip route, designated herein as trip-route insurance, can be presented to the individual. The computer technology also permits the motor vehicle to be operationally enabled for a selected trip route after the individual pre-authorizes the estimated amount of trip-route insurance for the selected trip route. In addition, the computer technology permits trip-segment insurance payments for segments of the selected trip route. Furthermore, the computer technology permits the trip-segment insurance payments to be adjusted based on deviations from a proposed trip route and based on behaviors (for example travel speed) of a driver of the motor vehicle.

FIG. 1 shows an example system 100 that can support trip-segment payments for vehicle insurance. The example system 100 includes a customer electronic computing device 102, a network 104, a server computing device 106, a database 110, a vehicle 112 and third-party electronic computing devices 116. The server computing device 106 includes a trip-route insurance processing engine 108. The vehicle 112 includes a vehicle operations engine 114. More, fewer or different components are possible.

The example customer electronic computing device 102 is an electronic computing device of an individual who can make a request for trip-route insurance for a trip using the motor vehicle 112. The motor vehicle 112 can either be a personal vehicle of the individual, a rental car or a leased car that has been modified to permit the vehicle to be operationally enabled upon a pre-authorization of trip-route insurance for the trip. The vehicle can also be an autonomous vehicle that can be owned, rented or leased by the individual. Customer electronic computing device 102 can be one of a desktop computer, laptop computer, tablet computer or smartphone. Customer electronic computing device 102 can also be an electronic computing device that is integrated into motor vehicle 112 (for example an on-board computing device). Other electronic computing devices are possible.

The example network 104 is a computer network such as the Internet. Customer electronic computing device 102, vehicle 112 and third-party electronic computing devices 116 can communicate with server computing device 106 using network 104.

The example server computing device 106 is a server computing device of a company that can provide trip-route insurance for motor vehicles that are configured to be operational or non-operational based on whether trip-route insurance has been pre-authorized for a trip using one of the motor vehicles. In some implementations, server computing device 106 can be a server computing device of a company that can provide the motor vehicles to the individual. In other implementations, server computing device 106 can be a server computing device of a financial institution, such as a bank, for which the individual has one or more financial accounts. For these implementations, server computing device 106 can also process requests for trip-route insurance for the motor vehicles.

The example trip-route insurance processing engine 108 can receive trip details from the individual at customer electronic computing device 102 and provide one more trip routes between starting and ending destinations for the trip. The trip-route insurance processing engine 108 can also calculate a cost of trip-route insurance for each of the trip routes and present the trip routes to the individual. When a route is selected and trip-route insurance is pre-authorized for the route, trip-route insurance processing engine 108 can enable the motor vehicle and permit the motor vehicle to operate. Once the trip starts, trip-route insurance processing engine 108 can monitor the trip and calculate trip-segment insurance for segments of the trip. Trip-route insurance processing engine 108 can also process payments for the trip-segment insurance and for pre-authorization of the trip-route insurance. Trip-route insurance processing engine 108 is described in more detail later herein.

In some implementations, the functions of trip-route insurance processing engine 108 can be incorporated on a software application of a smart device that is not integrated into vehicle 112. The smart device can be a smart phone, tablet computer or other smart device that comprises customer electronic computing device 102. The smart device can track the trip route, as well as local weather, sense speed, display information and accept user input from a keypad of the smart device or camera. Photos or video can be taken of vehicle 112 and surroundings. The smart device can stay with the individual and move from vehicle to vehicle. The smart device can communicate over network 104 to one or more of server computing device 106, database 110, third-party electronic computing devices 116 and vehicle operations engine 114 of vehicle 112.

In some implementations, the operations for receiving trip details and providing the trip routes can be performed on one or more of third-party electronic computing devices 116.

The third-party electronic computing devices 116 can provide the trip details and the trip routes to trip-route insurance processing engine 108. Third-party electronic computing devices 116 can comprise electronic computing devices of organizations such as ride sharing companies, car rental companies, financial institutions, insurance companies, and organizations that can provide information regarding items such as road conditions, weather conditions, routes and maps, driving history and other items, for example statistical data regarding motor vehicle accidents. Google is an example of a third-party organization than can provide routes and maps (e.g. Google Maps). Other third-party organizations are possible.

In another example implementation, the individual can sign a blanket contract with an organization (for example a financial institution, car rental company, ride sharing company, insurance company, etc.) for broad trip-route insurance coverage for vehicle 112. The organization can provide or obtain trip-route insurance for the individual for each ride taken by the individual in vehicle 12. However, instead of pre-authorizing the trip-route insurance for a selected route, the individual can pre-authorize a larger amount for multiple trips or the individual can open a line of credit with the organization for the larger amount of trip-route insurance for the multiple trips. The individual could then be permitted to drive or direct vehicle 112 anywhere and pay trip-segment insurance based on an actual route taken. Trip-route insurance processing engine 108 could then calculate the trip-segment insurance based on the actual route taken and the attributes of the route, such as traffic, weather and road conditions.

The example database 110 is a database associated with the company of server computing device 106. Database 110 can store information regarding individuals who are customers of the company and information regarding trip routes. The information regarding individuals can include personal data for the individuals, driving history and other data. The information regarding the trip routes can include information regarding segment-based charges. Database 110 can be distributed over a plurality of databases. Server computing device 106 can be programmed to query (e.g. using SQL) database 110 to obtain the customer information.

Database 110 can also store information regarding trip route and cost data for customers. An example schema of information stored in database 110 regarding the trip route and cost data for the customers is shown below:

Customer ID
Start location
Destination location
Vehicle type
Route A description
Segment A (Route A) description
Segment A (Route A) distance
Segment A (Route A) insurance cost per mile
Segment A (Route A) insurance cost for segment
Segment B (Route A) description
Segment B (Route A) distance
Segment B (Route A) insurance cost per mile
Segment B (Route A) insurance cost for segment
Segment C (Route A) description
Segment C (Route A) distance
Segment C (Route A) insurance cost per mile
Route B description
Segment A (Route B) description
Segment A (Route B) distance
Segment A (Route B) insurance cost per mile Segment A (Route B) insurance cost for segment
Segment B (Route B) description
Segment B (Route B) distance
Segment B (Route B) insurance cost per mile
Segment B (Route B) insurance cost for segment
Segment C (Route B) description
Segment C (Route B) distance
Segment C (Route B) insurance cost per mile
Segment C (Route B) insurance cost for segment The above schema permits the database to be queried for proposed routes (route A and route B) between a start location and a destination location for a customer with a specific customer ID. The schema also permits the database to be queried for specific segments of each route and for an estimated cost of each segment. Other schema comprising more or different routes and segments are possible.

For example, the following messaging format can be used between the server computing device 106 and the database 110 to obtain trip-segment insurance cost information.

| Customer ID | Start Location | Destination Location |
|---|---|---|

The database 110 can use the following messaging format in responding to such a request.

| Customer ID | Route A description | Segment A (Route A) | Segment A (Route A) cost | . . . |
|---|---|---|---|---|

The response message can include many additional fields depending on the route size and number of segments associated with the route.

The example third-party electronic computing devices 116 are electronic computing devices, for example server computing devices and databases from a variety of sources that can provide information regarding trip-route insurance and trip-segment insurance for the trip. The third-party electronic computing devices 116 can include motor vehicle rental and leasing companies for more conventional and autonomous vehicles, financial institutions at which the individuals can have one or more accounts, organizations that can provide weather information, road condition information and information regarding a driving history of the individuals. Other third party sources are possible.

The example vehicle 112 is a mobile vehicle that is configured to be remotely enabled or disabled for operation. When disabled, vehicle 112 is prevented from operating. When enabled, for example when trip-route insurance is pre-authorized for the individual, vehicle 112 is permitted to operate and travel on a selected route to an identified installation. Vehicle 112 can either be a conventional motor vehicle that can be driven by a human or vehicle 112 can be an autonomous vehicle.

The example vehicle operations engine 114 receives a selected route from the trip-route insurance processing engine 108 and navigates vehicle 112 along the route. Vehicle operations engine 114 also provides information regarding the occupants of the vehicle 112, monitors the route of vehicle 112 and controls the operation of vehicle 112. The information regarding the occupants of vehicle 112 can comprise information regarding how many humans are in vehicle 112, the ages of the humans, whether vehicle 112 is an autonomous vehicle and if vehicle 112 is not an autonomous vehicle, who is driving vehicle 112. Vehicle operations engine 114 is described in more detail later herein.

Figure 2:
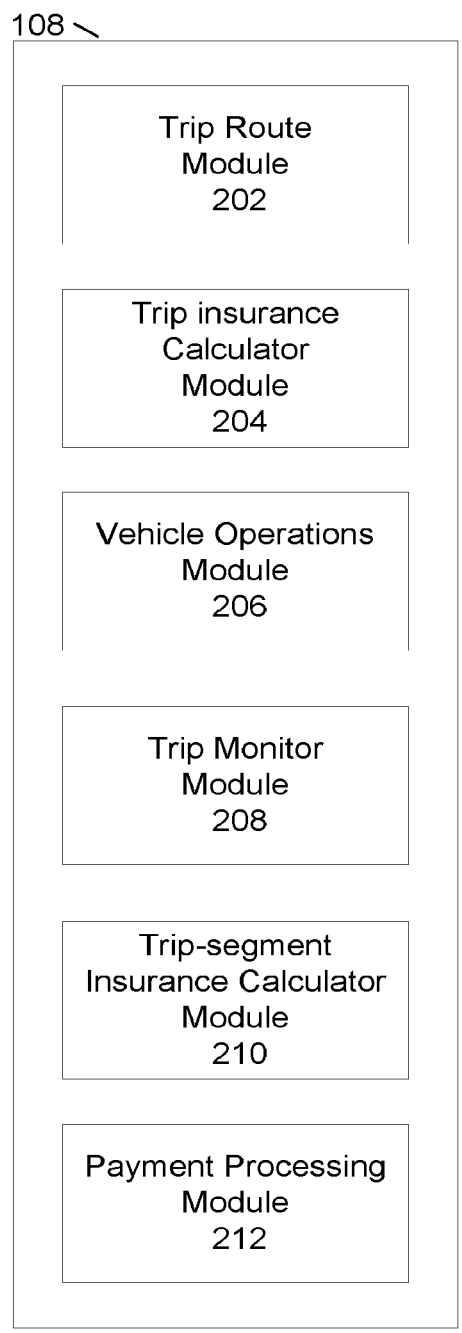
FIG. 2 show example modules of the trip-route insurance processing engine of FIG. 1.

FIG. 2 shows example modules of the trip-route insurance processing engine 108. Trip-route insurance processing engine 108 includes a trip route module 202, a trip-route insurance calculator module 204, a vehicle operation module 206, a trip monitor module 208, a trip-segment insurance calculator module 210 and a payment processing module 212.

The example trip route module 202, receives information regarding a starting location and destination location for a trip using vehicle 112. Trip route module 202 then determines one or more routes from the starting location to the destination location.

Trip route module 202 can also identify segments for each of the one or more routes. Trip segments can be identified using predefined road classification data or analytics to identify a segment type (e.g. city streets, highway in city, highway in country, etc.), segment distance and insurance rate per segment. A mapping module can be used to identify segment type and distance for each of the one or more routes. Segment data can be translated into geo position points that can be used for route adherence tracking.

The example trip-route insurance calculator module 204 calculates a cost of trip-route insurance for each of the one more routes. When calculating the cost of trip-route insurance, the trip-route insurance calculator module 204 uses information from database 110 and from third-party electronic computing devices 116 regarding such factors as the number and age of passengers in vehicle 112, the identity of a driver, if any, information regarding the driver's driving history, information regarding current weather conditions, current road conditions and other factors discussed earlier herein.

The example vehicle operation module 206 determines whether trip-route insurance has been pre-authorized for vehicle 112 and, when a determination is made that trip-route insurance has been pre-authorized, vehicle operation module 206 sends a command to vehicle 112 that enables operation of vehicle 112. In addition, when a determination is made that vehicle 112 has reached the destination location, vehicle operation module 206 sends a command to vehicle 112 that disables operation of vehicle 112. Vehicle 112 can remain disabled until a pre-authorization is received for another trip.

The example trip monitor module 208 monitors the geo-location of vehicle 112 as it proceeds along the selected trip route. Trip monitor module 208 can compare the actual route taken by vehicle 112 with the proposed selected trip route and identify any differences that may result in a higher or lower trip-segment insurance cost for segments of the trip route. In an example implementation, global positioning system (GPS) software on vehicle 112 can be used to track the geolocation of vehicle 112; vehicle 112 can then send the geolocation of vehicle 112 to server computing device 106 at periodic intervals, for example at every mile of the trip route. Trip monitor module 208 can also obtain information regarding trip conditions during the actual route, such as weather conditions and traffic conditions.

Trip monitor module 208 can also obtain information regarding driving habits that could affect trip-segment insurance costs. For example, risky routes and behaviors can result in a higher trip-segment insurance cost for a segment of the route. An example of a risky behavior is driving the vehicle 112 a significant amount over the speed limit. Conversely, the driver can be rewarded with a lower trip-segment insurance cost for good or responsible driving. For example, the drive could choose to take a route that is safer and has less traffic than a suggested route, thereby minimizing a risk of an accident. As another example of responsible driving, the driver can consistently keep vehicle 112 at or near posted speed limits.

Trip monitor module 208 can also use information regarding the actual route taken to identify non-traditional methods of insurance payments. For example, if vehicle 112 takes a route that goes past a business that has paid for vehicle 112 to take, for example a route in which any riders in vehicle 112 can view specific advertising, the business can pay for a portion or all of the trip-route insurance for the trip. As another example, when vehicle 112 changes the route to pick up an additional passenger, the additional passenger can share the trip-route insurance cost for the trip with the driver.

The example trip-segment insurance calculator module 210 calculates an actual cost of insurance for segments of the route traveled by vehicle 112. Trip-segment insurance calculator module 210 can receive information from trip monitor module 208 regarding the actual route taken by vehicle 112. When a segment of the route is completed, trip-segment insurance calculator module 210 can calculate an actual cost of insurance for the segment of the route, using the actual route taken and the trip conditions (such as the weather conditions and traffic conditions) for the segment of the route. Trip-segment insurance calculator module 210 can also determine whether the actual trip-segment insurance cost for the segment of the route is the same as or different from an estimated trip-route insurance cost for the segment of the route.

Trip-segment insurance calculator module 210 can also adjust a base insurance rate for a segment based on actual accidents or claims for the segment. The base insurance rate for each segment can be further adjusted based on one or more of time of day, traffic conditions, weather and other factors.

The example payment processing module 212 processes the pre-authorization for trip-route insurance for the selected trip route. The pre-authorization can comprise an authorization to charge the payment card an amount equal to the estimated trip-route insurance cost for the trip. Payment processing module 212 can also process trip-segment insurance payments for completed segments of the trip route. Trip-segment insurance payments can be used in lieu of a trip-route insurance payment. In some implementations, the payment card of the individual can be debited for the trip-segment insurance amount for each segment of the route when the segment of the route is completed. In other implementations, the trip-segment insurance amount for each segment of the route can be tabulated, but not charged, at the completion of each route. At the end of the trip route, the total tabulated trip-segment insurance amount for the trip can be debited from the payment card of the individual.

Figure 3:
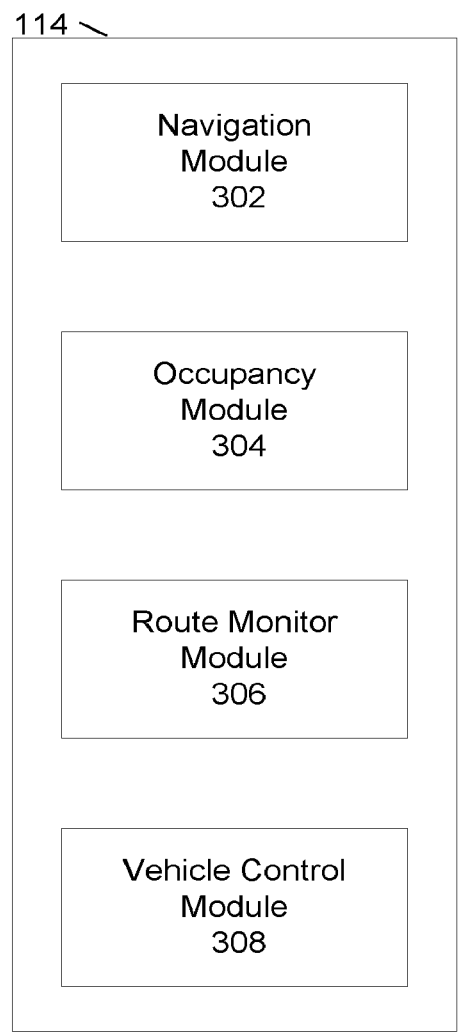
FIG. 3 shows example modules of the vehicle operations engine of FIG. 1.

FIG. 3 shows example modules of the vehicle operations engine 114. The vehicle operations engine 114 includes a navigation module 302, an occupancy module 304, a route monitor module 306 and a vehicle control module 308. More, fewer or different modules can be used.

The example navigation module 302 receives the selected route from server computing device 106 and implements the selected route in vehicle 112. When vehicle 112 is a traditional driver controlled vehicle, the navigation module 302 can display the route on a display screen of vehicle 112 or on a smart phone or other mobile device of the driver. When vehicle 112 is an autonomous vehicle, navigation module 302 can direct vehicle 112 to follow the selected route.

The example occupancy module 304 can determine a number of occupants in vehicle 112. Vehicle 112 can include one or more occupancy sensors that can detect when a human occupies a seat in vehicle 112. Occupancy module 304 can receive information from the one or more occupancy sensors. In some implementations, occupancy module 304 can also analyze voices from the human occupants in vehicle 112 and, by analyzing the voices, can determine characteristics of the occupants—for example whether a male, female or child. In some implementations, occupancy module 304 can initiate a dialog with the occupants of vehicle 112 and determine information such as name, age and sex of the occupants. In some implementations, occupancy module 304 can use camera and image analysis to determine age, sex and, where possible, identity of the occupants.

The example route monitor module 306 can monitor the actual route taken by vehicle 112 and provide the actual route information to server computing device 106. Server computing device 106 can, in turn, send the actual route information to trip-route insurance processing engine 108. The actual route can be determine via global positioning system (GPS) software in vehicle 112.

The example vehicle control module 308 can enable and disable operation of vehicle 112. Vehicle 112 can be configured to operate only when trip-route insurance is pre-authorized for a trip using vehicle 112. When a pre-authorization is processed for the trip, trip-route insurance processing engine 108 can send an enabling command to vehicle 112 to enable operation of vehicle 112. Similarly, when the trip is completed, trip-route insurance processing engine 108 can send a disabling command to vehicle 112 to disable operation of vehicle 112. Vehicle 112 can be enabled again when a pre-authorization is received for trip-route insurance for another trip in vehicle 112.

There can be various technical advantages associated with the systems and method described herein. For example, server computing device 106 can be configured to optimize a calculation of trip-segment insurance for a plurality of segments of a trip using a motor vehicle. The optimization is made possible via real-time information that is received during segments of the trip from a plurality of sources. This information, including such items as current road, weather and traffic conditions and geolocation information for an actual trip route of the motor vehicle, permits an optimized real-time calculation of a cost of the trip-segment insurance for the segments of the trip. This can result in fewer inquiries regarding the vehicle insurance for the trip. In addition, because of efficiencies in calculating the trip-segment insurance, server computer 106 can process more trip-route insurance operations. This can result in an overall system that is faster, uses less computing power and is able to handle an increased requests for trip trip-route insurance.

Figure 4:
FIG. 4 shows an example user interface for a trip using trip insurance for the vehicle of FIG. 1.

FIG. 4 shows an example user interface 400 for providing vehicle and location information for a trip using vehicle 112 so that alternative routes and a cost for trip insurance for the alternative routes can be identified. User interface 400 permits entering a type of vehicle 402, a vehicle description 404, a start location 406 for the trip and a destination location 408 for the trip. User interface 400 also includes a find routes 420 button for initiating an operation to identify the alternative routes.

The example type of vehicle 402 can be entered by pull-down list box 410. A list box control 412 permits the selection of one of sedan, SUV (sports utility vehicle), van, motor bike and sports car. Other vehicle types are possible. When selected, the selected vehicle type is displayed in pull-down list box 410. As, shown in FIG. 4, a sedan is selected as the type of vehicle 402. In some implementations, vehicle operations engine module 114 can automatically determine the vehicle type and send the vehicle type to server computing device 106. In these implementations, trip insurance processing engine 108 can automatically fill in the type of vehicle 402 on user interface 400.

The example vehicle description 404 is a textual description of the motor vehicle corresponding to type of vehicle 402 that is to be used for the trip. The vehicle description can be entered in an example text box 414. As shown in FIG. 4, Toyota Camry is the example vehicle description 404 entered in text box 414.

The example start location 406 is a textual description of the starting location for the trip. The start location 406 can be entered in an example text box 416. As shown in FIG. 4, IDS Center is the example start location entered in text box 416.

The example destination location 408 is a textual description of the destination location for the trip. The destination location 408 can be entered in an example text box 418. As shown in FIG. 4, State Capitol is the destination location entered in text box 418.

When the type of vehicle 402, the vehicle description 404, the start location 406 and the destination location 408 are entered into user interface 400, the user can select find routes 420 to initiate an operation to identify one or more routes for the trip.

Figure 5:
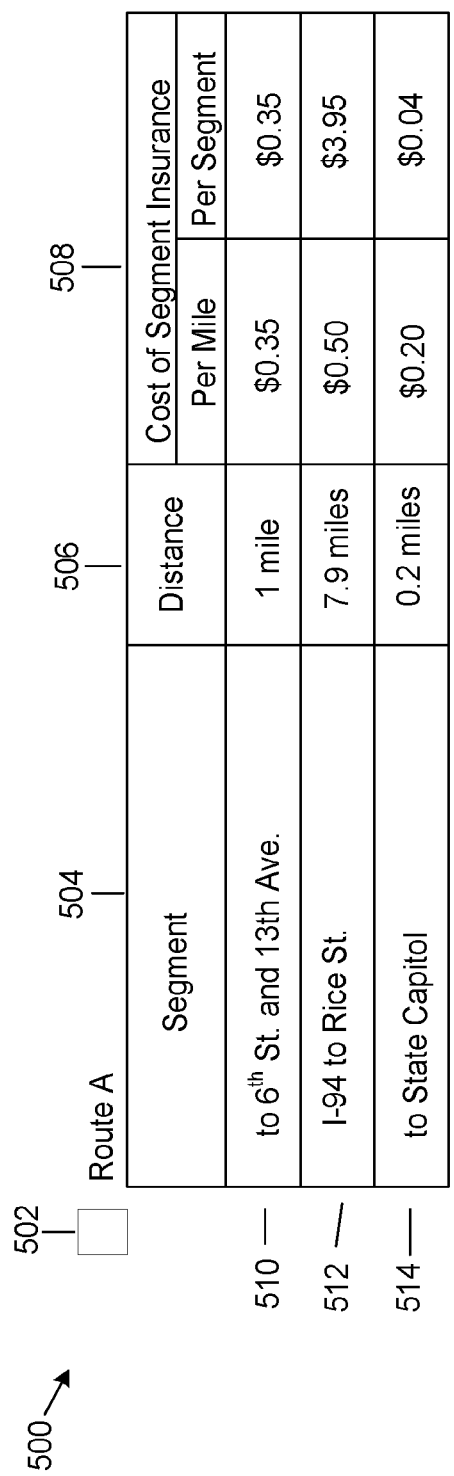
FIG. 5 shows another user interface for the trip using trip insurance for the vehicle of FIG. 1.
Figure 5:
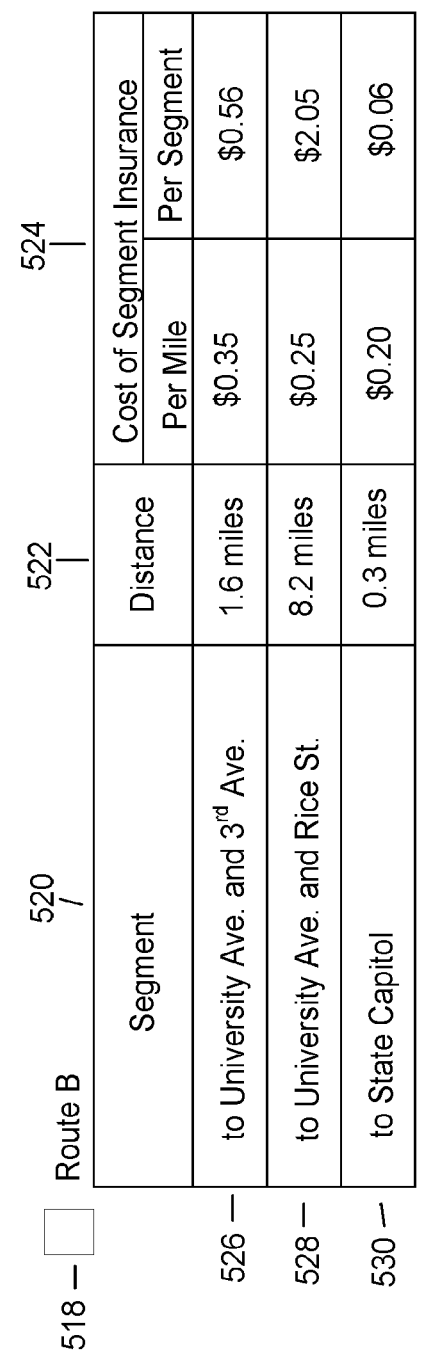
Figure 5:

FIG. 5 shows a user interface screen 500 that can be displayed as a result of the selection of find routes 420. User interface screen 500 shows information regarding two alternative routes for the trip. A first alternative route A shows a trip route that includes a segment that uses an interstate highway (I-94). A second alternative route B shows a trip route that does not include any segments that use the highway, but uses city streets instead. As discussed next herein, route A has an estimated cost of trip route insurance of $4.34. Route B 518 has an estimated cost of trip route insurance of $2.67.

As shown in FIG. 5, the example trip route A includes three identified segments. Each segment is described in segment column 504. A first example segment 510 is for the IDS Center to an intersection of $6^{th}$ Street and $13^{th}$ Avenue. A second example segment 512 uses interstate I-94 starting at the intersection of $6^{th}$ Street and $13^{th}$ Avenue and extends to Rice Street. A third example segment 514 uses city streets from Rice street to the state capitol.

User interface screen 500 also includes example columns for distance 506 of each trip segment and cost of segment insurance 508 for each trip segment. The cost of segment insurance 508 is further shown as a cost per mile and as a total cost per segment.

For user interface screen 500 what distinguishes one segment from another is an estimated cost of segment insurance per mile. For example, for segment 510 which includes a drive through downtown streets of a city, the cost per mile is $0.35. For segment 512, which is a segment of highway driving, the estimated cost of the segment insurance is $0.50. For segment 514, which is a segment of street driving not in a downtown area, the estimated cost of the segment insurance is $0.20. The total cost per segment is obtained by multiplying the estimated cost per mile by the distance for each segment.

User interface screen 500 also shows the estimated cost of trip route insurance for each alternative route. The estimated cost of trip route insurance for trip route A is shown to be $4.34. This cost is obtained by adding the estimated cost of insurance for each segment—in this example by adding $0.35, $3.95 and $0.04.

As shown in FIG. 5, example route B also includes three segments. However, whereas the second segment of route A is all highway driving, the second segment of route B uses city streets instead of the highway.

As per route A, user interface screen 500 includes columns for trip segment 520, distance 522 and cost of segment insurance 524. As shown in FIG. 5, a first example segment 526 is from the IDS Center along downtown streets to University Avenue and $3^{rd}$ Avenue. A second example segment uses city streets from University Avenue and $3^{rd}$ Avenue to University Avenue and Rice Street. A third example segment uses city streets from University Avenue and Rice Street to the State Capitol.

As shown in FIG. 5, although each trip segment 526, 528 and 530 uses city streets, an example cost of segment insurance 524 for each mile is different for each segment. Segment 526 runs through a downtown area so the cost of segment insurance is higher than for the other two segments. The example estimated cost of segment insurance is higher for segment 526 because the downtown area is presumed to have more traffic and congestion. Similarly, the example estimated cost of segment insurance for segment 528 of 0.25 per mile is lower than for segment 530, because segment 528 is not in the downtown area so is presumed to have less traffic and congestion than segment 526. However, the example estimated cost of segment insurance for segment 530 of $0.20 is less than for segment 528, because the streets near the State Capitol are presumed to have less traffic and congestion than the streets of segment 528.

The estimated cost of trip route insurance 532 for route B is $2.67 (equal to the sum of the cost of insurance for each segment). The cost of trip route insurance 532 for route B ($2.67) is less than the cost of trip route insurance 516 for route A ($4.34) because no highway driving is involved for route B and, therefore the cost of insurance for the second segment of route B is lower than the cost of insurance for the second segment of route A. However, route A is a faster route than route B because of the highway segment. The user can then make a selection based on lower insurance cost vs. faster time.

User interface screen 500 includes a checkbox 502 for route A and a checkbox 518 for route B. The user can choose a route by checking the corresponding checkbox—checkbox 502 or checkbox 518. The user can then click on select route button 534 to select the route corresponding to the checked checkbox.

Figure 6:
FIG. 6 shows yet another user interface for the trip using trip insurance for the vehicle of FIG. 1.

FIG. 6 shows an example user interface screen 600 that is displayed as a result of clicking the select route button 534 based on a selection of route A. User interface screen 600 displays a request 602 asking the user to authorize a payment card for $4.34, corresponding to the estimate amount of trip insurance for route A. As discussed earlier, herein, the payment of the estimated trip insurance for a route needs to be authorized before vehicle 112 is made operational for the trip along the route. To authorize the payment, the user can select the authorize amount 604 button. To cancel, the user can select the cancel 606 button.

Figure 7:
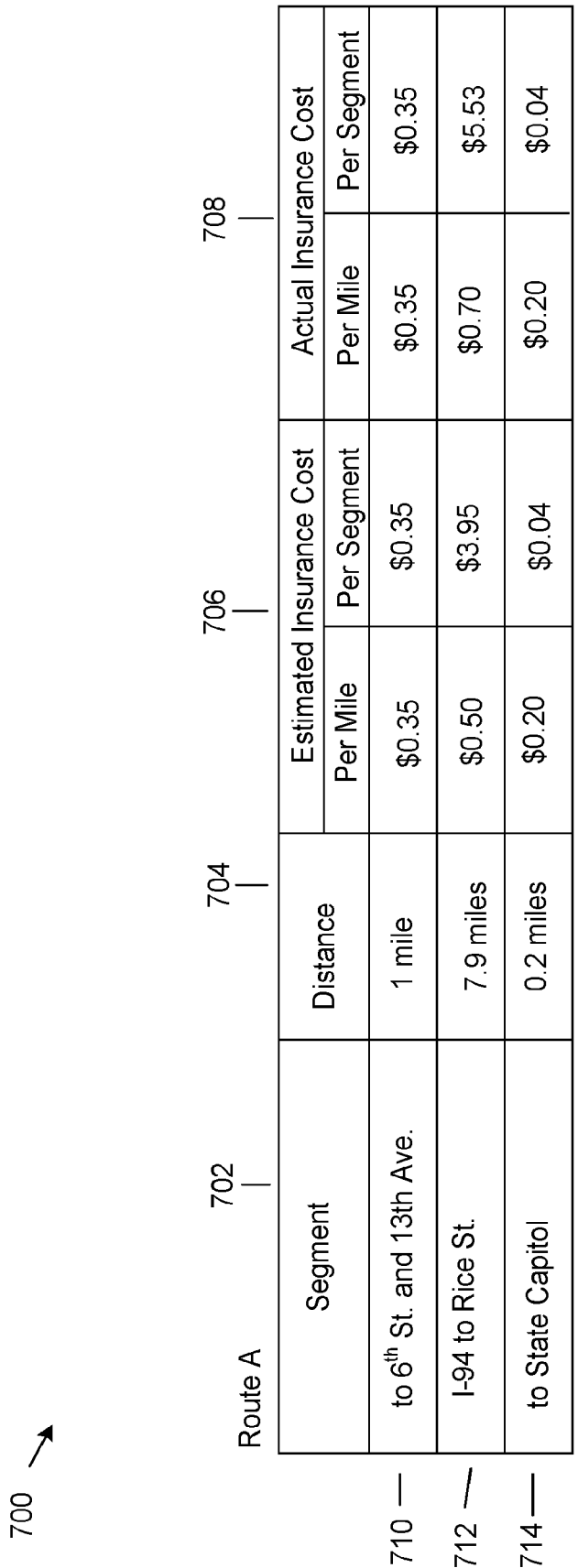
FIG. 7 shows yet another user interface for the trip using trip insurance for the vehicle of FIG. 1.

FIG. 7 shows an example user interface screen 700 that shows a summary of the trip in vehicle 112 using route A. User interface screen 700 can be displayed at the completion of the trip. User interface screen 700 includes columns showing actual trip segments 702 completed during the trip, the distance 704 actually travelled during each segment, the estimated insurance cost 706 for each segment and an actual insurance cost 708 for each segment.

As shown in FIG. 7, the actual trip includes three segments—segments 710, 712 and 714—that are the same as the estimated segments for route A shown in FIG. 5. However, as shown in FIG. 7, the actual insurance cost per mile for segment 712 is $0.70 per mile, compared to the estimated insurance cost per mile for segment 712 of $0.50 per mile. The actual insurance cost per mile for segment 712 is higher than the estimated cost per mile because during the actual trip traffic congestion was determined to be higher than estimated for segment 712. This resulted in a higher insurance cost per mile. The actual insurance cost per mile for segments 710 and 714 are the same as the estimated insurance cost per mile for these segments. As a result, user interface screen 700 shows an actual cost of route insurance 718 of $5.92, which is higher than the estimated cost of route insurance 716 of $4.32. As a result, at the completion of the trip using route A, the payment card of the user is debited for $5.92.

In other example implementations, route segments can be taken that are different than the proposed route segments. At the completion of the trip actual route segments taken during the trip are shown in FIG. 7 and actual insurance costs for the actual route segments are determined. This can result in an actual cost of trip insurance that is greater or less than the estimated cost of trip route insurance.

Figure 8:
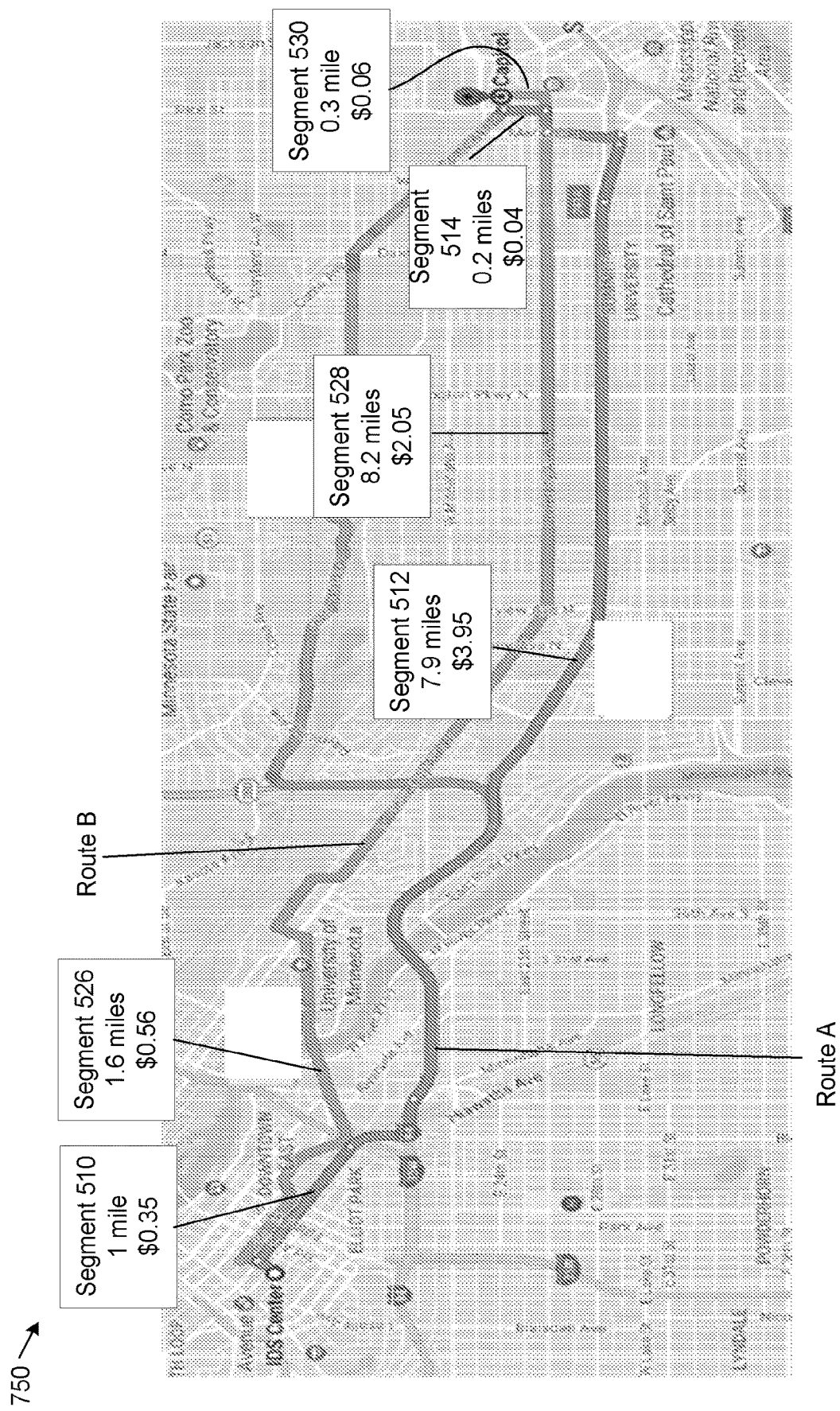
FIG. 8 shows yet another user interface for the trip using trip insurance for the vehicle of FIG. 1.

FIG. 8 shows an example user interface screen 750 that shows the route segments of routes A and B on a map. Each segment of each route shown on user interface screen 750 corresponds to the route segments shown in FIG. 5. For example, route A comprises three segments—segment 510, segment 512 and segment 514 and route B also comprises three segments—segment 526, segment 528 and segment 530. User interface screen 750 also shows the length and cost of each segment.

Figure 9:
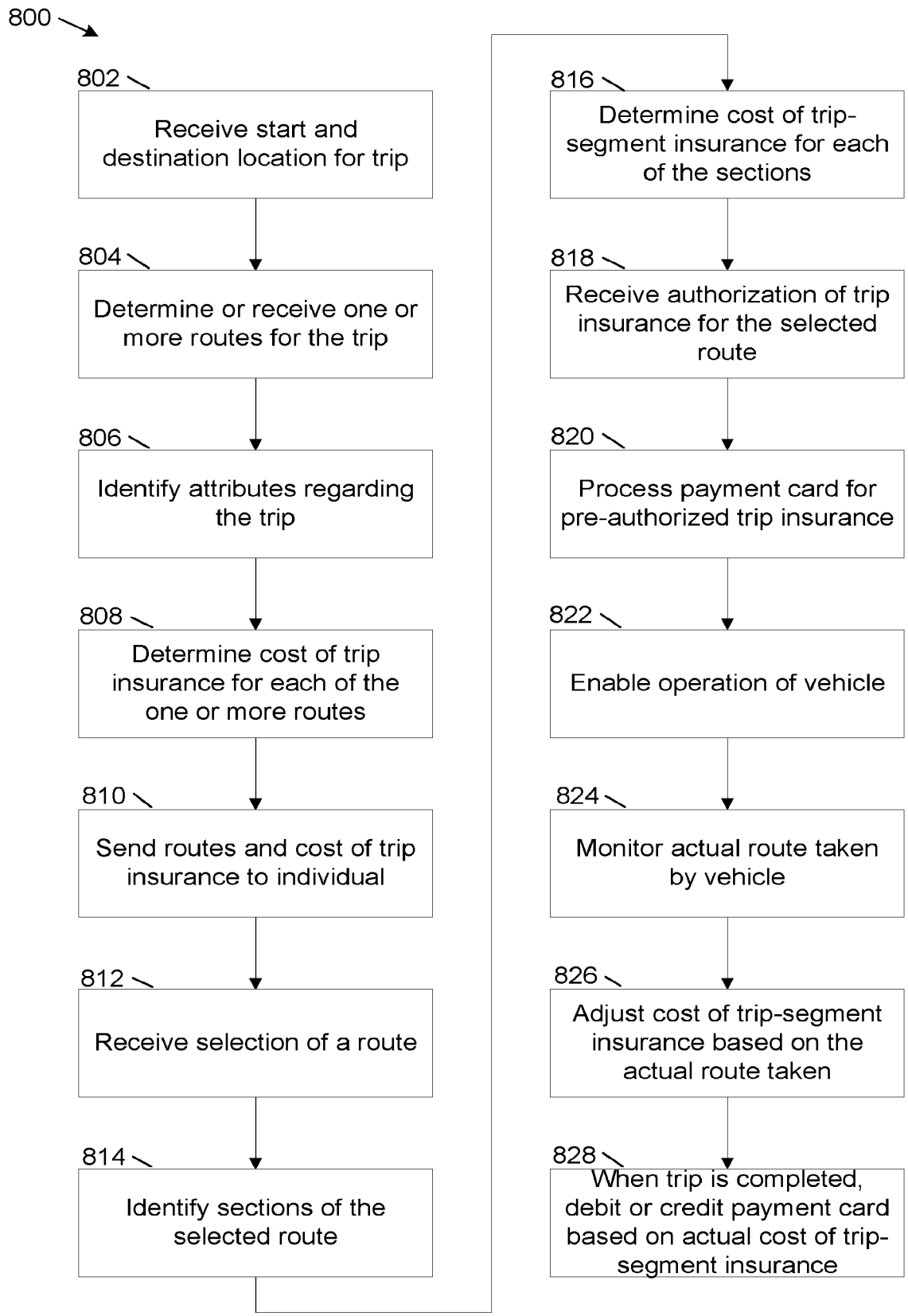
FIG. 9 shows an example method for processing a trip request that requires trip-route insurance.

FIG. 9 shows a flowchart for an example method 800 implemented on server computing device 106 processing a trip request that requires trip-route insurance for vehicle 112. The trip request is initiated by an individual at customer electronic computing device 102.

At operation 802, server computing device 106 receives the starting location and the destination location for a trip using vehicle 112. The starting location and the destination location can be sent to server computing device 106 from an individual at customer electronic computing device 102. In some implementations, customer electronic computing device 102 can send the starting and destination locations to one of third-party electronic computing devices 116 and the third-party electronic computing devices 116 can in turn send the starting and destination location to server computing device 106. For example, the starting and destination locations can be sent to a ride sharing company that provides autonomous vehicles configured to be remotely enabled for operation upon a pre-authorization of trip-route insurance.

At operation 804, trip-route insurance processing engine 108 determines one or more routes for the trip based on the starting and destination locations. The one or more routes can be determined to provide different options for the individual, such as a fastest route, a cheapest route (for example, one that minimizes one or more of tolls and gasoline), a scenic route and a less congested route. Other types of routes are possible.

At operation 806, one more attributes regarding the trip are identified. Attributes can include things like the age and driving history of the driver, road conditions, weather conditions and vehicle type. Operation 806 is discussed in more detail with regard to FIG. 9.

At operation 808, trip-route insurance processing engine 108 determines the cost of trip-route insurance for each of the one or more routes. The cost of trip-route insurance is based on the starting and destination locations, the characteristics of the route and the trip attributes identified in operation 806. The cost of the trip-route insurance includes a cost of insurance for each segment of the trip route and is based, in part, on the identified attributes regarding the trip.

At operation 810, the routes and the cost of trip-route insurance for the routes are sent to the individual at customer electronic computing device 102. The individual at customer electronic computing device 102 is typically the individual that initiated the trip request.

At operation 812, server computing device 106 receives a selection of a route from the individual at customer electronic computing device 102.

At operation 814, segments of the trip are identified. The segments can be at fixed intervals, for example every mile, or at defined parts of the trip, such as driving through city streets, driving on city highways and driving on rural highways.

At operation 816, a cost of trip-segment insurance is determined for each of the identified segments of the trip. The cost of the trip-segment insurance can be identified based on the trip attributes from operation 806.

At operation 818, server computing device 106 receives an authorization for a cost of trip-route insurance for the route selected in operation 812.

At operation 820, trip-route insurance processing engine 108, processes a payment card of the individual for the cost of the trip-route insurance pre-authorized at operation 818. For the implementation for method 800, a pre-authorization is processed for the estimated cost of trip-route insurance for the trip and the payment card is debited for the amount of the cost. As discussed earlier herein and also later herein, with respect to operation 828, the payment card is then credited for the actual cost of trip-segment insurance during or at the completion of the trip route.

In another implementation, pre-authorization can be handled differently. For example, at operation 820, the cost of the trip-route insurance can be pre-authorized but not debited from the payment card. In this implementation, the payment card is then debited for the cost of trip-segment insurance during or at the completion of the trip route. Other payment implementations are possible.

At operation 822, based on the authorization of the trip-route insurance for the trip, trip-route insurance processing engine 108 initiates sending a command to vehicle 112 to enable operation of vehicle 112.

At operation 824, vehicle operations engine 114 monitors the geolocations of the actual route taken by vehicle 112. Vehicle operations engine 114 periodically sends selected geolocations to trip-route insurance processing engine 108. Route monitor module 306 then determines the actual route taken by vehicle 112 based on the received geolocation data.

At operation 826, the cost of trip-segment insurance determined at operation 816 is adjusted based on the actual route taken for a completed segment of the route. Adjusted trip-segment insurance costs for each segment of the route are aggregated after each segment of the route is completed.

At operation 828, when the trip is completed, the individual's payment card is debited or credited for the actual cost of trip-segment insurance for the trip. For the case where the individual's payment card was already debited for the pre-authorization amount, if the total actual cost of trip-segment insurance is greater than the pre-authorization amount, the difference between the total actual cost and the pre-authorization amount is debited from the payment card. If the total actual cost of trip-segment insurance is less than the pre-authorization amount, the payment card is credited for the difference between the total actual cost and the pre-authorization amount.

For the case where the individual's payment card was not debited for the pre-authorization amount, the total actual cost of trip-segment insurance is debited from the payment card. In some implementations, for the case where the individual's payment card was not debited for the pre-authorization amount, the actual cost of trip-segment insurance for each segment of the trip is debited from the individual's payment card when the segment of the respective segment of the trip is completed.

In some implementations, the individual's payment card can be debited for the cost of trip-segment insurance for each segment of the trip after the respective segment of the trip is completed. In these implementations, passengers in vehicle 112 can view micro-payments made on a display screen in vehicle 112.

Figure 10:
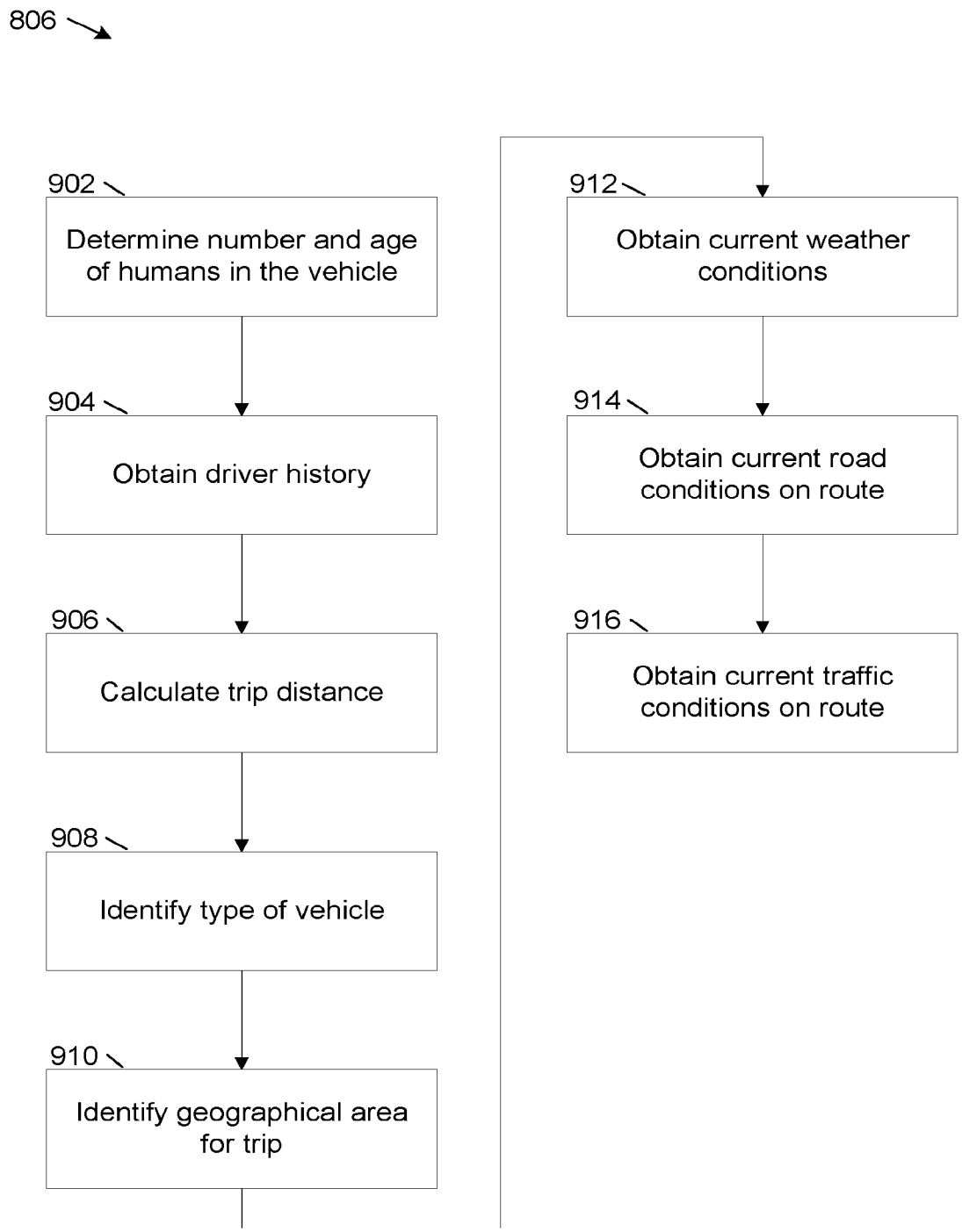
FIG. 10 shows an example operation of the method of FIG. 5.

FIG. 10 shows a flowchart for the example operation 806 of method 800 for identifying attributes regarding the trip. The steps of operation 806 shown in FIG. 8 comprised one specific example implementation. More, fewer or different steps can be included. Trip-route insurance processing engine 108 can obtain the attributes from one or more of database 110, vehicle 112 and third-party electronic computing devices 116.

At operation 902, a determination is made as to a number and age of humans in vehicle 112. The occupancy module 304 of vehicle operations engine 114 can monitor sensors that can determine the number of humans in vehicle 112. For example, weight sensors can be included in the seats of vehicle 112. Occupancy module 304 can monitor the weight sensors and can determine from a measured weight whether the seat is occupied and determine, based on the weight, whether the occupant is a child or an adult.

Occupancy module 304 can also monitor other aspects of vehicle 112 to determine whether a human is driving vehicle 112. For example, occupancy module 304 can determine whether a human is controlling the steering wheel and the gas and brake pedals. Occupancy module 304, can also attempt to determine the identity of the driver. For example, occupancy module 304 can obtain information from trip-route insurance processing engine 108 regarding individuals who may be registered to drive vehicle 112. When one of the registered individuals is a male and the other is a female, occupancy module 304 can monitor voice sensors in vehicle 112 to make a determination as to who is driving vehicle 112. In some implementation, the driver of vehicle 112 may be required to use a biometric sensor in vehicle 112, for example a finger print scanner or a facial or retinal scanner to be identified. For example, a facial or retinal scanner can be built into the dashboard or another part of vehicle 112 to focus on the driver and provide biometric information to occupancy module 304. Also, if vehicle 112 is a semi-autonomous vehicle, a determination is made as to which of the humans is a designated driver who would handle emergency situations. If vehicle 112 is a fully autonomous vehicle, no designated driver needs to be assigned.

At operation 904, a driving history of the driver identified at operation 902 is obtained. For example, the driving history can be obtained from one of third-party electronic computing devices 116. The driving history can include a history of any accidents and moving violations, such as speeding tickets, received by the driver. The driver history can also include a history of driving behaviors, such as whether the driver consistently drives at or near posted speed limits.

At operation 906, trip-route insurance processing engine calculates a distance for the trip. The distance is calculated based on the starting location for the trip and the destination location.

At operation 908, the type of vehicle being used on the trip is identified. The type of vehicle used can have an impact on the cost of trip-route insurance for the trip. Some example vehicle types can include compact cars, full-size sedans, vans and SUVs. The type of vehicle can be identified from information included on one or more of server computing device 106, database 110 and third-party electronic computing devices 116.

At operation 910, a geographical area for the trip is identified. The geographical area can be a name of a city, part of a city, town, state, region or country. Other geographical areas are possible. The geographical area can be identified via information from one or more of third-party electronic computing devices 116.

At operation 912, current weather conditions along the trip route are obtained. The current weather conditions can be obtained from one or more of third-party electronic computing devices 116.

At operation 914, current road conditions on the trip route are obtained. The current road conditions can be obtained from one or more of third-party electronic computing devices 116.

At operation 916, current traffic conditions on the trip route are obtained. The current traffic conditions can be obtained from one or more of third-party electronic computing devices 116.

Figure 11:
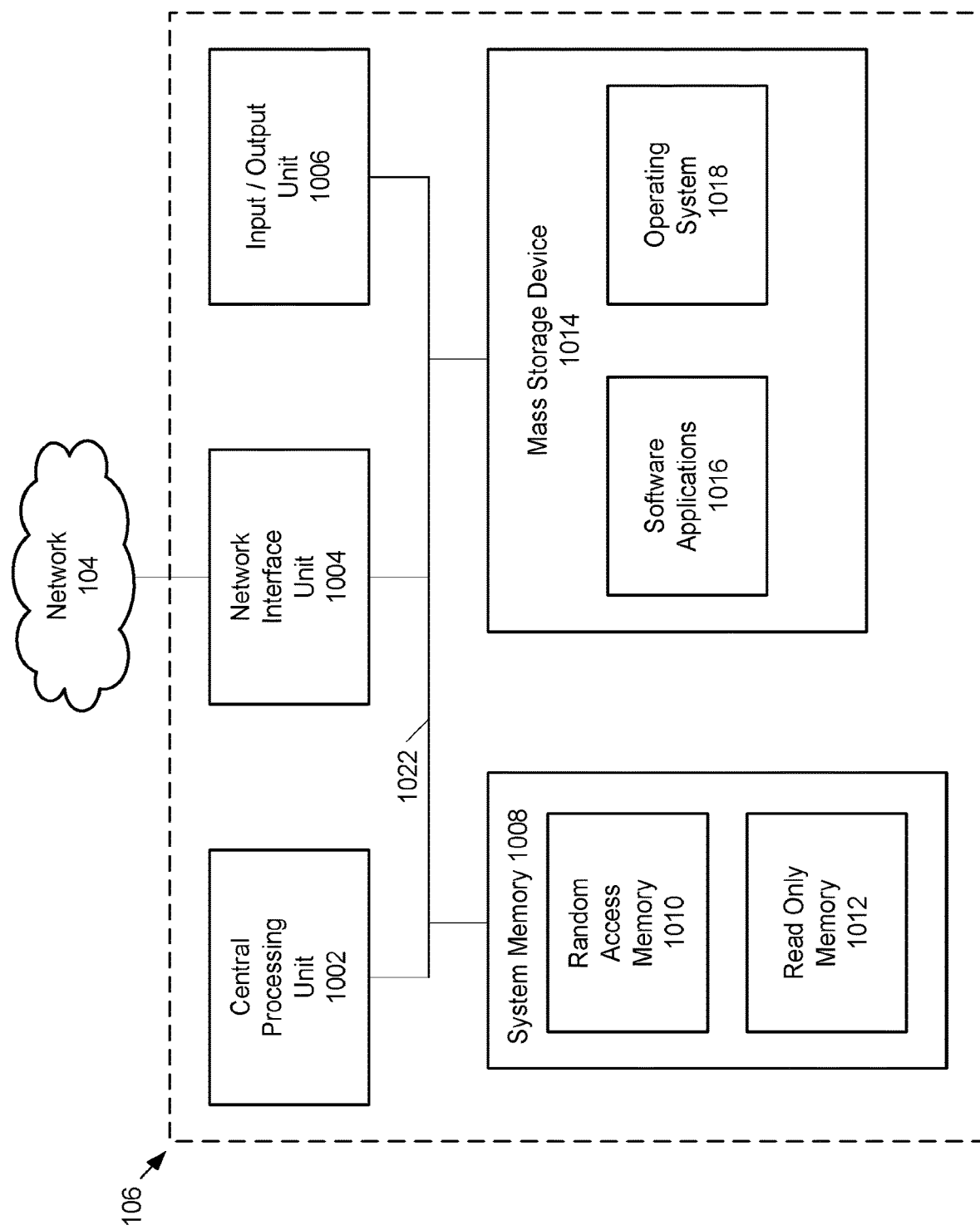
FIG. 11 shows example physical components of the server computing device of FIG. 1.

As illustrated in the example of FIG. 11, server computing device 106 includes at least one central processing unit ("CPU") 1002, also referred to as a processor, a system memory 1008, and a system bus 1022 that couples the system memory 1008 to the CPU 1002. The system memory 1008 includes a random access memory ("RAM") 1010 and a read-only memory ("ROM") 1012. A basic input/output system that contains the basic routines that help to transfer information between elements within the server computing device 106, such as during startup, is stored in the ROM 1012. The server computing device 106 further includes a mass storage device 1014. The mass storage device 1014 is able to store software instructions and data. Some or all of the components of the server computing device 106 can also be included in customer electronic computing device 102 and in third-party electronic computing devices 116.

The mass storage device 1014 is connected to the CPU 1002 through a mass storage controller (not shown) connected to the system bus 1022. The mass storage device 1014 and its associated computer-readable data storage media provide non-volatile, non-transitory storage for the server computing device 106. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computing device 106.

According to various embodiments of the invention, the server computing device 106 may operate in a networked environment using logical connections to remote network devices through the network 104, such as a wireless network, the Internet, or another type of network. The server computing device 106 may connect to the network 104 through a network interface unit 1004 connected to the system bus 1022. It should be appreciated that the network interface unit 1004 may also be utilized to connect to other types of networks and remote computing systems. The server computing device 106 also includes an input/output controller 1006 for receiving and processing input from a number of other devices, including a touch user interface display screen, or another type of input device. Similarly, the input/output controller 1006 may provide output to a touch user interface display screen or other type of output device.

As mentioned briefly above, the mass storage device 1014 and the RAM 1010 of the server computing device 106 can store software instructions and data. The software instructions include an operating system 1018 suitable for controlling the operation of the server computing device 106. The mass storage device 1014 and/or the RAM 1010 also store software instructions and software applications 1016, that when executed by the CPU 1002, cause the server computing device 106 to provide the functionality of the server computing device 106 discussed in this document. For example, the mass storage device 1014 and/or the RAM 1010 can store software instructions that, when executed by the CPU 1002, cause the server computing device 106 to display received data on the display screen of the server computing device 106.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an electronic computing device for determining vehicle insurance costs, the method comprising:
   receiving a starting location and a destination location for a trip using an autonomous vehicle;
   determining or receiving one or more routes for the autonomous vehicle from the starting location to the destination location;
   receiving a selection of one of the one or more routes, wherein at least a first route of the one or more routes includes an advertisement;
   determining or receiving an incentive to select the first route;
   receiving an authorization for trip-route insurance for the one of the one or more routes;
   after the authorization for trip-route insurance is received, issuing a first command to the autonomous vehicle to permit the autonomous vehicle to start;
   after each segment of the trip is completed, calculating a cost of trip-segment insurance for the respective segment of the trip;
   at a completion of the trip, calculating a total cost of trip-segment insurance for the trip; and
   at the completion of the trip, debiting or crediting a payment card of an individual for the total cost of trip-segment insurance for the trip.

2. The method of claim 1, wherein at the completion of the trip,
   further comprising issuing a second command to the autonomous vehicle to prevent the autonomous vehicle from driving.

3. The method of claim 1, further comprising:
   determining identification information regarding humans occupying the autonomous vehicle during the trip; and
   adjusting the cost of trip-segment insurance for at least one segment of the trip based on the identification information regarding the humans.

4. The method of claim 3, further comprising:
   determining weather conditions during the trip;
   determining road conditions for one or more segments of the trip;
   determining traffic conditions during the trip; and
   adjusting the cost of trip-segment insurance for at least one segment of the trip based on one or more of the weather conditions, the road conditions and the traffic conditions.

5. The method of claim 4, further comprising:
   monitoring speed of the autonomous vehicle during the trip; and
   when the speed of the autonomous vehicle is consistently at or near speed limits for the respective segments of the trip, reducing the cost of trip-segment insurance for at least one of the segments of the trip.

6. The method of claim 1, further comprising:
   determining weather conditions during the trip;
   determining road conditions for one or more segments of the trip;
   determining traffic conditions during the trip; and
   adjusting the cost of trip-segment insurance for at least one segment of the trip based on one or more of the weather conditions, the road conditions and the traffic conditions.

7. The method of claim 6, further comprising:
   monitoring speed of the autonomous vehicle during the trip; and
   when the speed of the autonomous vehicle is consistently at or near speed limits for the respective segments of the trip, reducing the cost of trip-segment insurance for at least one of the segments of the trip.

8. The method of claim 1, further comprising:
   monitoring speed of the autonomous vehicle during the trip; and
   when the speed of the autonomous vehicle is consistently at or near speed limits for the respective segments of the trip, reducing the cost of trip-segment insurance for at least one of the segments of the trip.

9. An electronic computing device comprising:
   a processor; and
   system memory, the system memory including instructions which, when executed by the processor, cause the electronic computing device to:
   receive a starting location and a destination location for a trip using an autonomous vehicle;
   determine or receive one or more routes for the autonomous vehicle from the starting location to the destination location;
   determine a cost of trip-route insurance for each of the one or more routes for the trip;

provide to the autonomous vehicle the cost of trip-route insurance for each of the one or more routes for the trip;
provide to the autonomous vehicle an offer or incentive for a reduced cost of insurance for a selection of a specific route;
receive a selection of the one or more routes, wherein at least a first route of the one or more routes includes an advertisement;
determine or receive an incentive to select the first route;
determine whether the specific route was selected;
when a determination is made that the specific route was selected, receive an authorization for trip-route insurance and reduce the cost of trip-route insurance for the specific route;
after the authorization for trip-route insurance is received, issue a first command to the autonomous vehicle to permit the autonomous vehicle to start;
enable operation of the autonomous vehicle for the trip along the one or more routes;
identify a plurality of segments for the one of the one or more routes that is selected;
monitor an actual route taken by the autonomous vehicle;
when each segment of the actual route is completed, determine a cost of trip-segment insurance for each respective segment of the actual route;
when each segment of the actual route is completed, aggregate the cost of trip-segment insurance by maintaining a total cost of trip-segment insurance and adding to the total cost the cost of trip-segment insurance for the completed segment of the actual route; and
at a completion of the trip, debit a payment card for the total cost of trip-segment insurance for the trip.

10. The electronic computing device of claim 9, wherein at the completion of the trip, the system memory includes further instructions which, when executed by the processor, cause the electronic computing device to issue a second command to the autonomous vehicle to prevent the autonomous vehicle from driving.

11. The electronic computing device of claim 9, comprising further instructions which, when executed by the processor, cause the electronic computing device to:
determine identification information regarding humans occupying the autonomous vehicle during the trip; and
adjust the cost of trip-segment insurance for at least one segment of the trip based on the identification information regarding the humans.

12. The electronic computing device of claim 11, comprising further instructions which, when executed by the processor, cause the electronic computing device to:
determine weather conditions during the trip;
road conditions for one or more segments of the trip;
determine traffic conditions during the trip; and
adjust the cost of trip-segment insurance for at least one segment of the trip based on one or more of the weather conditions, the road conditions and the traffic conditions.

13. The electronic computing device of claim 12, comprising further instructions which, when executed by the processor, cause the electronic computing device to:
monitor speed of the autonomous vehicle during the trip; and
when the speed of the autonomous vehicle is consistently at or near speed limits for the respective segments of the trip, reduce the cost of trip-segment insurance for at least one of the segments of the trip.

14. The electronic computing device of claim 9, comprising further instructions which, when executed by the processor, cause the electronic computing device to:
determine weather conditions during the trip;
determine road conditions for one or more segments of the trip;
determine traffic conditions during the trip; and
adjust the cost of trip-segment insurance for at least one segment of the trip based on one or more of the weather conditions, the road conditions and the traffic conditions.

15. The electronic computing device of claim 14, comprising further instructions which, when executed by the processor, cause the electronic computing device to:
monitor speed of the autonomous vehicle during the trip; and
when the speed of the autonomous vehicle is consistently at or near speed limits for the respective segments of the trip, reduce the cost of trip-segment insurance for at least one of the segments of the trip.

16. The electronic computing device of claim 9, comprising further instructions which, when executed by the processor, cause the electronic computing device to:
monitor speed of the autonomous vehicle during the trip; and
when the speed of the autonomous vehicle is consistently at or near speed limits for the respective segments of the trip, reduce the cost of trip-segment insurance for at least one of the segments of the trip.

* * * * *

UNITED STATES PATENT AND TRADEMARK OFFICE
CERTIFICATE OF CORRECTION

| | | |
|---|---|---|
| PATENT NO. | : 11,922,512 B1 | Page 1 of 1 |
| APPLICATION NO. | : 17/659609 | |
| DATED | : March 5, 2024 | |
| INVENTOR(S) | : Kolls et al. | |

It is certified that error appears in the above-identified patent and that said Letters Patent is hereby corrected as shown below:

In the Claims

Column 19, Line 32, Claim 9: delete "the cost"

Column 20, Line 5, Claim 12: delete "road" and insert --determine road--

Signed and Sealed this
Twenty-third Day of April, 2024

*Katherine Kelly Vidal*

Katherine Kelly Vidal
*Director of the United States Patent and Trademark Office*